(12) United States Patent
Kellstrand et al.

(10) Patent No.: US 11,170,329 B1
(45) Date of Patent: *Nov. 9, 2021

(54) SYSTEM AND METHOD OF INITIATING IN-TRIP AUDITS IN A SELF-CHECKOUT SYSTEM (71) Applicant: Catalina Marketing Corporation, St. Petersburg, FL (US)

(72) Inventors: Michael Kellstrand, Braintree, MA (US); Satish Gopalakrishnan, Arlington, MA (US); Jason Carney, Hanson, MA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,489

(22) Filed: Jul. 2, 2019

Related U.S. Application Data

(63) Continuation of application No. 13/896,862, filed on May 17, 2013, now Pat. No. 10,387,817.

(60) Provisional application No. 61/648,315, filed on May 17, 2012.

(51) Int. Cl.
*G06Q 10/06* (2012.01)
*G06Q 30/06* (2012.01)

(52) U.S. Cl.
CPC ......... *G06Q 10/0635* (2013.01); *G06Q 30/06* (2013.01)

(58) Field of Classification Search
CPC ............................ G06Q 10/0635; G06Q 30/06
See application file for complete search history.

(56) References Cited

U.S. PATENT DOCUMENTS

| 5,557,513 A | 9/1996 | Frey |
| 5,877,485 A | 3/1999 | Swartz |
| 5,918,211 A | 6/1999 | Sloan |

(Continued)

FOREIGN PATENT DOCUMENTS

| JP | 2008-539493 | 11/2008 |
| JP | 2011-503724 | 1/2011 |
| WO | 2013173701 | 11/2013 |

OTHER PUBLICATIONS

Peng-Cheng, L., et al., "Fuzzy of logic-based approach for identifying the risk of importance of human error", Safety Science 48 (2010), pp. 902-913.

(Continued)

*Primary Examiner* — Jonathan G Sterrett
(74) *Attorney, Agent, or Firm* — McDermott, Will & Emery LLP (57) ABSTRACT

The system and method described herein may be used to make a binary determination of whether to initiate an in-trip audit of self-scans in a self-checkout system. For example, the system may receive one or more audit parameters that are used to calculate an audit score. The audit score may be compared to a predefined audit threshold to determine, during a shopping trip, whether to initiate the in-trip audit. After or in combination with making the binary determination, the system may make a probabilistic determination of whether to initiate an audit based on historical audit points associated with the shopper. The audit points are incremented or decremented based on prior audits and other characteristics of the shopper.

20 Claims, 5 Drawing Sheets

(56) References Cited

U.S. PATENT DOCUMENTS

| | | | |
|---|---|---|---|
| 5,923,735 A | 7/1999 | Swartz | |
| 5,965,861 A | 10/1999 | Addy | |
| 6,243,447 B1 | 6/2001 | Swartz | |
| 6,345,288 B1* | 2/2002 | Reed | H04L 63/045 707/999.001 |
| 6,434,530 B1 | 8/2002 | Sloan | |
| 6,522,772 B1 | 2/2003 | Morrison | |
| 6,687,346 B1 | 2/2004 | Swartz | |
| 6,827,260 B2 | 12/2004 | Stoutenburg | |
| 7,114,656 B1 | 10/2006 | Garver | |
| 7,272,570 B2 | 9/2007 | Sadler | |
| 7,606,728 B2 | 10/2009 | Sorensen | |
| RE41,093 E | 2/2010 | Lutz | |
| 8,396,758 B2 | 3/2013 | Paradise | |
| 8,665,333 B1 | 3/2014 | Sharma | |
| 8,795,061 B2* | 8/2014 | Burrill | G07F 17/3239 463/25 |
| 10,387,817 B2 | 8/2019 | Kellstrand | |
| 2003/0102373 A1 | 6/2003 | Swartz | |
| 2003/0132298 A1* | 7/2003 | Swartz | G07G 3/00 235/472.02 |
| 2004/0201611 A1* | 10/2004 | Bagsby | G06Q 40/02 715/733 |
| 2005/0259797 A1 | 11/2005 | Swartz | |
| 2007/0027806 A1* | 2/2007 | Sands | G06Q 20/108 705/42 |
| 2007/0058040 A1 | 3/2007 | Zhang | |
| 2007/0210155 A1 | 9/2007 | Swartz | |
| 2008/0140479 A1 | 6/2008 | Mello | |
| 2009/0125406 A1 | 5/2009 | Lewis | |
| 2011/0029362 A1 | 2/2011 | Roeding et al. | |
| 2011/0279272 A1 | 11/2011 | Wieth et al. | |
| 2012/0321146 A1* | 12/2012 | Kundu | G06Q 20/202 382/118 |
| 2013/0132241 A1 | 5/2013 | Sorensen | |
| 2013/0311230 A1 | 11/2013 | Kellstrand | |

OTHER PUBLICATIONS

Kim, B. J., et al., "Uncertainty of human error and fuzzy approach to human reliability analysis", International Journal of Uncertainty, Fuzziness and Knowledge-Based Systems, vol. 14, No. 1 (2006), pp. 111-129.

Written Opinion of the International Searching Authority for international application No. PCT/US2013/041563, dated Jul. 24, 2013, 5 pages.

International Search Report for international application No. PCT/US2013/041563, dated Jul. 24, 2013, 2 pages.

* cited by examiner

Primary Audit Method Table — 300

| Error Percentage | Partial Audit Points | Full Audit Points |
|---|---|---|
| 0 to 5 | 100 | |
| First Time Customer 0 to 50 | 80 | 50 |
| 6 to 10 | 50 | 80 |
| 11 to 15 | 10 | 0 |
| 16 to 20 | 0 | -10 |
| 21 to 30 | -30 | -30 |
| 31 to 40 | -50 | -50 |
| 41 to 100 | -100 | -70 |
| First Time Customer 51 to 100 | 0 | -100 |
| | | 0 |

FIG. 3

Settings For Categories

Please remember to update each setting separately

| Description | Value | Key | |
|---|---|---|---|
| Audit type - 2 for partial | PARTIAL ▼ | AUDIT_TYPE | update |
| Points Lost per Trip | 10 | POINTS_LOST_PER_TRIP | update |
| Max number of Items Voided For Audit to be triggered | 10 | NUM_VOIDED_ITEMS_FOR_AUDIT_TRIGGER | update |
| Number of Points that a customer starts with | 999 | STARTING_POINTS_FOR_CUSTOMER | update |
| Minimum items in the cart to be exempt from audit | 999 | MIN_ITEMS_IN_CART_TO_EXEMPT | update |
| Cart total to be exempt from audit | 999 | MIN_CART_TOTAL_TO_EXEMPT | update |
| Scan and Remove Audit trigger turned on | true ▼ | SCAN_AND_REMOVE_AUDIT_ALLOWED | update |
| Number of minutes to be considered a long trip | 1440 | LONG_TRIP_TIME_IN_MINS | update |
| Cart total to be considered a small basket for long trip trigger | 0 | LONG_TRIP_SMALL_BASKET_SIZE | update |
| Number of consecutive small baskets to trigger audit | 4 | CONSECUTIVE_SMALL_BASKET_COUNT | update |
| Cart total to be considered a small basket for consecutive small basket trigger | 8 | CONSECUTIVE_SMALL_BASKET_SIZE | update |
| Minimum items required to be scanned during an audit | 6 | MIN_ITEMS_TO_SCAN | update |
| This is % of items required to be scanned during an audit if items in cart are less than min items required to be scanned during an audit. | 50 | MIN_ITEMS_TO_SCAN_PERCENTAGE | update |

FIG. 4

Governor Settings

Set the Peak Hours and Thresholds:

From: [12:00AM ▾] To: [12:30AM ▾] Threshold: [5 ▾] Audit Frequency: [ ] Minutes

From: [12:00AM ▾] To: [12:30AM ▾] Threshold: [5 ▾] Audit Frequency: [ ] Minutes

From: [12:00AM ▾] To: [12:30AM ▾] Threshold: [5 ▾] Audit Frequency: [ ] Minutes

All Hours Outside The Range Provided will be set as Off-Peak Hours.

Set the Threshold for Off-Peak Hours:

Threshold: [5 ▾] Audit Frequency: [ ] Minutes

[Back]                                                          [Submit]

FIG. 5

SYSTEM AND METHOD OF INITIATING IN-TRIP AUDITS IN A SELF-CHECKOUT SYSTEM

CROSS-REFERENCE TO RELATED APPLICATIONS

The present application claims the benefit of priority under 35 U.S.C. § 120 as a continuation of U.S. patent application Ser. No. 13/896,862 entitled "SYSTEM AND METHOD OF INITIATING IN-TRIP AUDITS IN A SELF-CHECKOUT SYSTEM," filed on May 17, 2013, which claims the benefit of U.S. Provisional Patent Application Ser. No. 61/648,315, filed May 17, 2012, both of which are hereby incorporated by reference in their entirety.

FIELD OF THE INVENTION

The invention relates generally to initiating audits in a checkout system and in particular to making binary determinations of whether to initiate an in-trip audit in a self-checkout system based on audit parameters received during a shopping trip and also combining binary determinations with probabilistic determinations of whether initiate an audit.

BACKGROUND

Some self-checkout systems allow a shopper (used interchangeably herein with "customer") to scan items using a self-scan device, which is generally portable and may be carried in a retail store during a shopping trip. Such systems can benefit the shopper by potentially minimizing wait times by avoiding conventional checkout lines and also can benefit the retailer by reducing labor costs due to checkout automation. An example of such a system is described in U.S. Pat. No. 6,243,447, filed Jan. 29, 1999, which is incorporated by reference herein in its entirety.

However, these conventional self-checkout systems are prone to both intentional and unintentional scan errors by the shopper. For example, the shopper may intentionally scan a less expensive item and actually place a more expensive item in a shopping basket or cart. Unintentional errors, such as a forgetting to scan or not properly scanning an item, may also occur. Whether unintentional or intentional, these scan errors can lead to lost profits and detract from the advantages offered by self-checkout systems.

Thus, what is needed is an ability to audit self-scans in order to correct errant scans, whether intentional or unintentional. What is further needed is an ability to perform such audits on an in-trip basis that makes binary determinations of whether to audit. What is further needed is an ability to combine in-trip binary determinations with longer-term probabilistic determinations of whether to audit. These and other drawbacks exist.

SUMMARY OF INVENTION

The invention addressing these and other drawbacks in conventional systems relates generally to a system and method for providing determinations of whether to initiate an in-trip audit in self-checkout systems. In some implementations of the invention, the system may receive one or more audit parameters during a shopping trip. In some implementations, the one or more audit parameters may include information that indicates the duration of the shopping trip. For example, the information may include a start time when a self-scan device was initialized and an end time when checkout occurs and/or may simply include a value associated with a timer that is run during the shopping trip. In some implementations, the one or more audit parameters may include a number and/or a total value of a plurality of scans that occurred during the shopping trip. In some implementations, the one or more audit parameters may include a length of time between two scans. In some implementations, the one or more audit parameters may include a number of voids during the shopping trip.

In some implementations of the invention, the system may calculate an audit score based on the one or more audit parameters. In some implementations, the system may calculate the audit score by determining the duration of the shopping trip based on the start and end times or obtaining another duration indicator. In some implementations, the system may calculate the audit score by determining a basket size-to-duration ratio based on a number of scanned items and/or value of the scanned items and the duration of the shopping trip.

In some implementations of the invention, the system may compare the audit score to a predefined audit threshold. In some implementations, the predefined audit threshold may be set by the retailer to indicate when an in-trip audit should be triggered. For example, the predefined audit threshold may include a minimum basket size-to-duration ratio below which an in-trip audit is triggered. In some implementations, various audit parameters may be combined with one another. In the foregoing example, the basket size may be combined with duration of the shopping trip such that the audit score is based on a ratio between the basket size and the duration. For instance, a shopper who scanned five items having a total value of two dollars during a two hour shopping trip may fall have an audit score (ratio of basket size to duration) that falls below a minimum threshold for that audit parameter.

In some implementations of the invention, the system may determine whether the audit score exceeds (where the threshold is a maximum) or is below (where the threshold is a minimum) the predefined audit threshold.

In some implementations of the invention, if the audit score exceeds or is below the predefined audit threshold, the system may determine that the in-trip audit should occur.

In some implementations of the invention, if the audit score does not exceed or is not below the predefined audit threshold, the system may determine that the in-trip audit should not occur.

In some implementations, after or in combination with the binary determination, the system may further determine a probability that the shopper should be audited. In these implementations, the system may determine a number of audit points associated with the shopper. The total number of audit points may be incremented or decremented based on the shopper. In some implementations, a greater number of audit points may be associated with a reduced probability of being audited (although the opposite could be true). For example, the system may decrement the number of audit points for a shopper who has not been audited such that a shopper who has not been audited has an increased probability of being audited in the future. The total number of points may also be incremented or decremented based on prior audit results. For example, having few or no errors in a prior audit may result in an award of audit points while having many errors may result in a deduction of audit points. The total number of points may be decremented each shopping trip to insure all shoppers are audited at least periodically.

Various other objects, features, and advantages of the invention will be apparent through the detailed description of the invention and the drawings attached hereto. It is also to be understood that both the foregoing general description and the following detailed description are exemplary and not restrictive of the scope of the invention.

DETAILED DESCRIPTION

Figure 1:
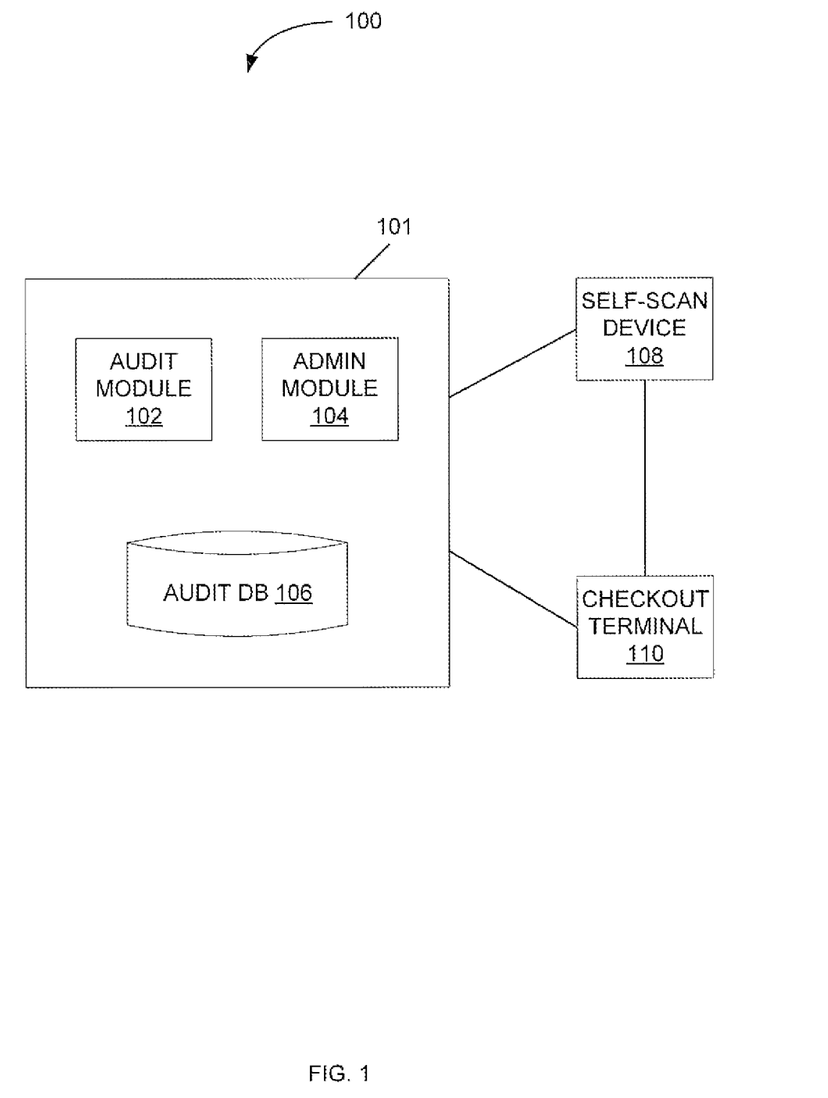
FIG. 1 illustrates a block diagram of a system for initiating an in-trip audit, in accordance with various embodiments of the present invention.

FIG. 1 illustrates a block diagram of a system 100 for initiating an in-trip audit, in accordance with various embodiments of the present invention. An "in-trip audit" includes an audit that is initiated during a shopping trip. A shopping trip may begin when a shopper starts a self-scanning session such as by picking up a store-provided self-scan terminal or activating a self-scan application on a mobile device. The shopping trip may end when the shopper checks out (e.g., pays for self-scanned items).

According to various implementations of the invention, system 100 may include, for example, an audit computer 101, an audit module 102, an administrative module 104, an audit database 106, a self-scan device 108, a checkout terminal 110. Self-scan device 108 may include, for example, a self-scan terminal provided by a store, a mobile device such as a smartphone configured with a self-scan application, or other generally portable device that allows a user to self-scan items during the shopping trip.

In some implementations, audit module 102 may receive an audit parameter and compare the audit parameter to a predefined audit threshold. The audit parameter may include, for example, the duration of a shopping trip, a number of scans or voids (e.g., scanned then removed items) during the shopping trip, a number or value (e.g., price) of items scanned during the shopping trip, and/or a number of consecutive shopping trips having a low number or value of scanned items. In some implementations, the predefined audit threshold may be variable depending on the type of item being scanned. For example, the threshold for voiding particular types of items such as seafood or deli items may be less than for other types of items. In a particular example, voiding two seafood or deli items may cause the in-trip audit to occur whereas voiding two canned goods may not cause the in-trip audit to occur.

The predefined audit threshold may include, for example, a maximum duration of the shopping trip, a maximum number of scans or voids during the shopping trip, a minimum number or value of items scanned during the shopping trip, and/or a maximum number of consecutive shopping trips that have a low number or value of scanned items. In some implementations, the predefined audit threshold may be configured by each retailer or location according to particular needs.

In some implementations, audit module 102 may determine whether an in-trip audit should occur based on comparing the audit parameter with the predefined audit threshold. For example, if the duration of the shopping trip exceeds a maximum time allowed, audit module 102 may determine that the in-trip audit should occur. In some implementations, the audit parameter acts as a trigger such that when it exceeds or falls below the predefined audit threshold, the in-trip audit is automatically triggered as a binary (True/False) decision rather than a probabilistic decision.

In some implementations, audit module 102 may cause the scans of the shopping trip and/or audit history to be stored in audit database 104. As such, a shopper's self-scan and audit history may be stored and known for further reference. In some implementations, audit module 102 may determine whether the in-trip audit should occur further based on past shopping trips and/or audit history of shoppers.

In some implementations, if audit module 102 does not trigger the in-trip audit based on the audit parameter, audit module 102 may determine a probability that the in-trip audit should still occur. In some implementations, the probability may be based on a shopper's audit points, which may include a running total of audit points. Based on the shopper's prior self-scan and/or audit history, audit points may be added or subtracted to the shopper's running total of audit points.

In some implementations, audit module 102 may determine whether the in-trip audit should occur based on a combination of the audit parameter and the probability that the in-trip audit should occur. For example, audit module 102 may use the probability as a weight for the audit parameter such that a high probability (based on audit points), combined with an audit parameter that alone would not otherwise trigger an in-store audit, causes the in-store audit.

Table 1 illustrates points that are added to a shopper's running total of audit points based on an error percentage of prior audits of that shopper. In the example illustrated by Table 1, lower error percentages (e.g., rates of errant scans) of prior audits result in an award of higher audit points such that a greater point total results in a lesser probability of being audited in the future, as illustrated in Table 2. As would be appreciated, the values listed in Tables 1 and 2 are exemplary only and not intended to be limiting. Other values may be used as appropriate. In some implementations, other factors may result in a reward or deduction of audit points. For example, each shopping trip in which a shopper is not audited may result in a deduction of audit points, increasing the probability of being audited. In this manner, as the number of shopping trips increases without being audited increases, the probability of being audited may increase.

TABLE 1

| Error percentage | Audit Points |
|---|---|
| 0-5 | +100 |
| 6-10 | +50 |
| 11-15 | +10 |
| 16-20 | 0 |
| 21-30 | −30 |
| 31-40 | −50 |
| 41-100 | −100 |

TABLE 2

| Points | Probability |
| --- | --- |
| Negative | 100% |
| 0-25 | 75% |
| 26-50 | 50% |
| 51-100 | 25% |
| 101-200 | 10% |
| 201+ | 0% |

In some implementations, administrative module 104 may be used to change settings or otherwise configure the behavior of audit module 102. In some implementations, for example, a retailer may use administrative module 104 to adjust the predefined audit threshold values, number of points with which a customer starts, number of points lost per trip, a minimum number of items exempt from audit, a cart total to be exempt from audit, a minimum number of items to be scanned during an audit, and/or whether a first self-scan should always be audited.

In some implementations, administrative module 104 may be used to flag an in-trip audit to occur irrespective of the audit parameter or probability. In some implementations, the flag may include, for example, an always audit flag that indicates all shopping trips should be audited, a flag next shopping trip that indicates a subsequent shopping trip is to be audited, and a particular shopping trip flag that indicates a particular self-scan device or shopper should be audited. In some implementations, the flag may be communicated directly and/or via self-scan device 108 to checkout terminal 110. Upon detection of the flag, checkout terminal 110 may cause the audit to occur.

In some implementations, the in-trip audit may include a partial audit, where a subset of self-scanned items are manually scanned and checked by a cashier or other personnel. In other implementations, the audit may include a full audit, where all self-scanned items are manually scanned and checked. In some implementations, the system determines the minimum number of items for the retailer employee to scan for the partial audit based upon number of items and/or percentage size of the shopper's basket. In some implementations, a partial in-trip audit may trigger or otherwise cause a full in-trip audit depending on the results of the partial in-trip audit. For example, if a high proportion of the items checked during the partial in-trip audit are errant, a full in-trip audit may be triggered.

In some implementations, audit module 102 and/or administrative module 104 may cause self-scan device 108 to indicate that a partial in-trip audit, a full in-trip audit, or no audit should occur irrespective of the audit parameter or the probability. In these implementations, checkout terminal 110 may receive the indication and determine whether the in-trip audit should occur. For example, audit module 102 and/or administrative module 104 may cause self-scan device 108 to display a special checkout barcode that encodes the indication. Checkout terminal 110 may read the special checkout barcode and act accordingly.

In some implementations, the predefined audit threshold may be different for a partial in-trip audit than for a full in-trip audit. In other words, in some implementations, different criteria may be applied to determine whether a partial in-trip audit or a full in-trip audit should occur. Similarly, addition and/or subtraction of audit points may be different for partial in-trip audits than for full in-trip audits.

In operation, a shopper may begin a shopping trip by initiating use of self-scan device 108, which may include picking up a self-scan terminal provided by a store, launching a self-scan application at the shopper's mobile device, or using another device that allows the shopper to self-scan items. The shopper may use self-scan device 108 to self-scan a plurality of items and void, or remove, a scanned item. In some implementations, self-scan device 108 may store the scans into a memory (not illustrated in FIG. 1). In some implementations, self-scan device 108 may periodically or continuously communicate the scans during the shopping trip to a remote device, which stores the scans for later retrieval.

In some implementations, the shopper completes the shopping trip by checking out the scanned items. For example, the shopper may present self-scan device 108 to a checkout terminal 110. Self-scan device 108 then communicates the scans to checkout terminal 110. In some implementations, self-scan device 108 presents and checkout terminal 110 reads a barcode that encodes an identifier that is associated with the scans. Checkout terminal 110 then looks up the scans based on the identifier. In other implementations, checkout terminal 110 reads the scans from self-scan device 108.

In some implementations, during the shopping trip, audit module 102 may monitor audit parameters such as a number of scanned and/or voided items, time between scans, and/or other audit parameters. In some of these implementations, prior to checkout, audit module 102 may determine whether an in-trip audit should occur. In other words, by the time checkout occurs, the in-trip audit may already be determined such that checkout terminal 110 is informed that the in-trip audit should occur. In other implementations, during checkout, audit module 102 determines whether the in-trip audit should occur.

In some implementations, audit module 102 and/or administrative module 106 may be implemented as hardware such as an audit computer 101 that includes a processor (not illustrated in FIG. 1) configured to perform functions described herein with respect to the audit module. In some implementations, audit module 102 may be implemented as part of audit computer 101, self-scan device 108 and/or checkout terminal 110 such that some of all of these devices may be configured to perform at least some of the functions of audit module 102 described herein.

Figure 2:
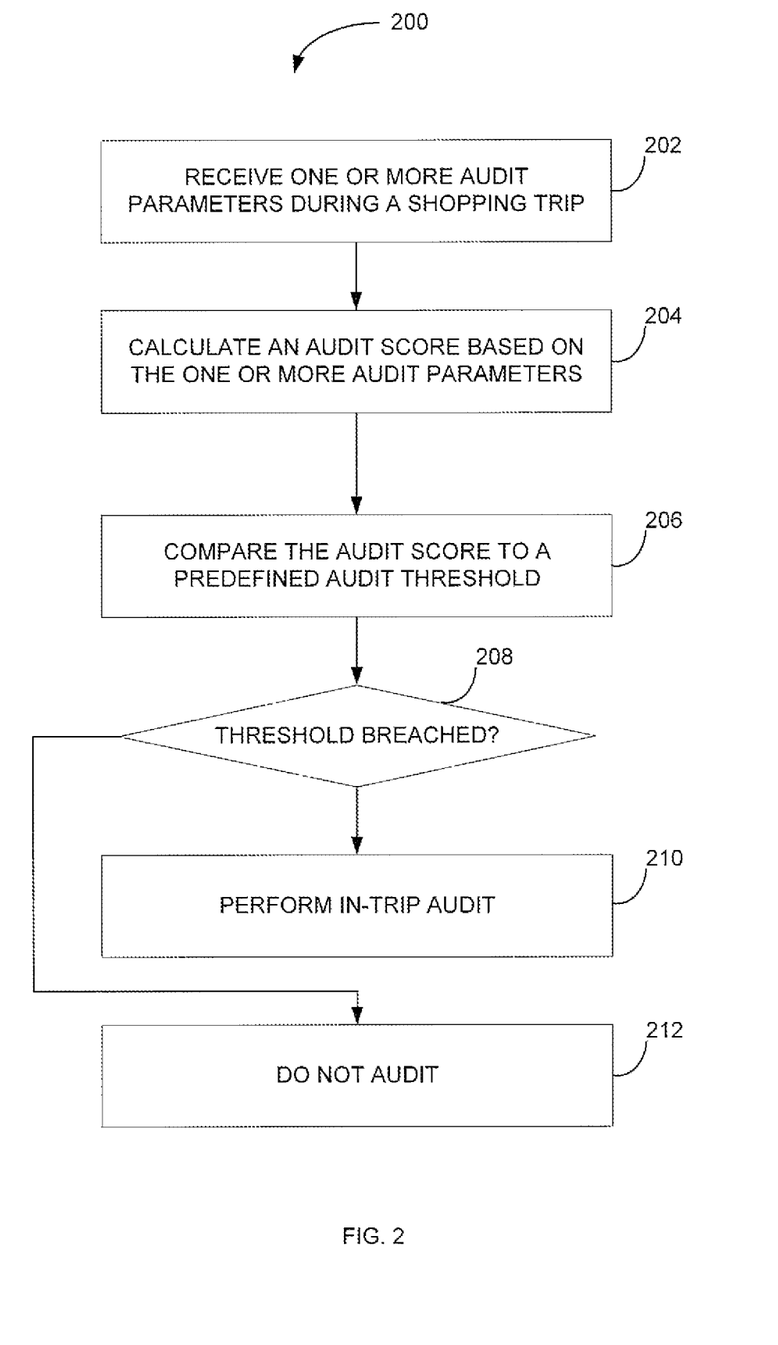
FIG. 2 illustrates a flow diagram of a process for initiating an in-trip audit, in accordance with various embodiments of the present invention.

FIG. 2 illustrates a flow diagram of a process 200 for initiating an in-trip audit for a shopping trip, in accordance with various embodiments of the present invention. Although some of the operations of process 200 may be discussed below with respect to the components of system 100 described above and illustrated in FIG. 1, it should be appreciated that this is for illustrative purposes only, and that process 200 may be implemented with alternative components and/or systems without departing from the scope of this disclosure. Further, the particular arrangement of the operations illustrated in FIG. 2, other drawing figures and described hereafter is not intended to be limiting. In some implementations, various ones of the operations could be performed in an order other than the one set forth, various ones of the operations may be combined with others and/or be omitted altogether, and/or various additional operations may be added without departing from the scope of the disclosure, as should be appreciated.

In some implementations of the invention, in an operation 202, process 200 may include receiving one or more audit parameters during a shopping trip. In some implementations, the one or more audit parameters may include information that indicates the duration of the shopping trip. For example, the information may include a start time when self-scan device 102 was initialized and an end time when checkout occurs and/or may simply include a value for a timer. In some implementations, the one or more audit parameters may include a number and/or a total value of a plurality of scans that occurred during the shopping trip. In some implementations, the one or more audit parameters may include a length of time between two scans. In some implementations, the one or more audit parameters may include a number of voids during the shopping trip.

In some implementations of the invention, in an operation 204, process 200 may include calculating an audit score based on the one or more audit parameters. In some implementations, calculating the audit score may include determining the duration of the shopping trip based on the start and end times or determining another duration indicator. In some implementations, calculating an audit score may include determining a basket size (indicative of the scanned items) based on a number of scanned items and/or value of the scanned items. For example, the shopper may have scanned five items having a total value of two dollars.

In some implementations of the invention, in an operation 206, process 200 may include comparing the audit score to a predefined audit threshold. In some implementations, the predefined audit threshold may be set by the retailer to indicate when an in-trip audit should be triggered. For example, the predefined audit threshold may include a minimum basket size-to-duration ratio below which an in-trip audit is triggered.

The foregoing audit parameters are exemplary only and not intended to be limiting. In some implementations, various audit parameters may be combined with one another. In the foregoing example, the basket size may be combined with duration of the shopping trip such that the audit score is based on a ratio between the basket size and the duration. For instance, a shopper who scanned five items having a total value of two dollars during a two hour shopping trip may have an audit score (ratio of basket size to duration) that falls below a minimum threshold ratio.

In some implementations of the invention, in an operation 208, process 200 may include determining whether the audit score exceeds (where the threshold is a maximum) or is below (where the threshold is a minimum) the predefined audit threshold.

In operation 208, if the audit score exceeds or is below the predefined audit threshold, process 200 may proceed to an operation 210, which may include determining that the in-trip audit should occur.

In operation 208, if the audit score does not exceed or is not below the predefined audit threshold, process 200 may proceed to an operation 212, which may include determining that the in-trip audit should not occur.

In some implementations, after or in combination with operations 210 and/or 212, process 200 may further determine a probability that the shopper should be audited. In some implementations, process 200 may determine the probability based on parameters described in Tables 1 and 2. In some implementations, for example, process 200 may include determining a number of audit points associated with the shopper. The total number of audit points may be incremented or decremented based on the shopper. In some implementations, a greater number of audit points may be associated with a reduced probability of being audited (although the opposite could be true). For example, process 200 may include decrementing the number of audit points for a shopper who has not been audited such that a shopper who has not been audited has an increased probability of being audited in the future. The total number of points may also be incremented or decremented based on prior audit results. For example, having few or no errors in a prior audit may result in an award of audit points while having many errors may result in a deduction of audit points. The total number of points may be decremented each shopping trip to insure all shoppers are audited at least periodically.

Figure 3:
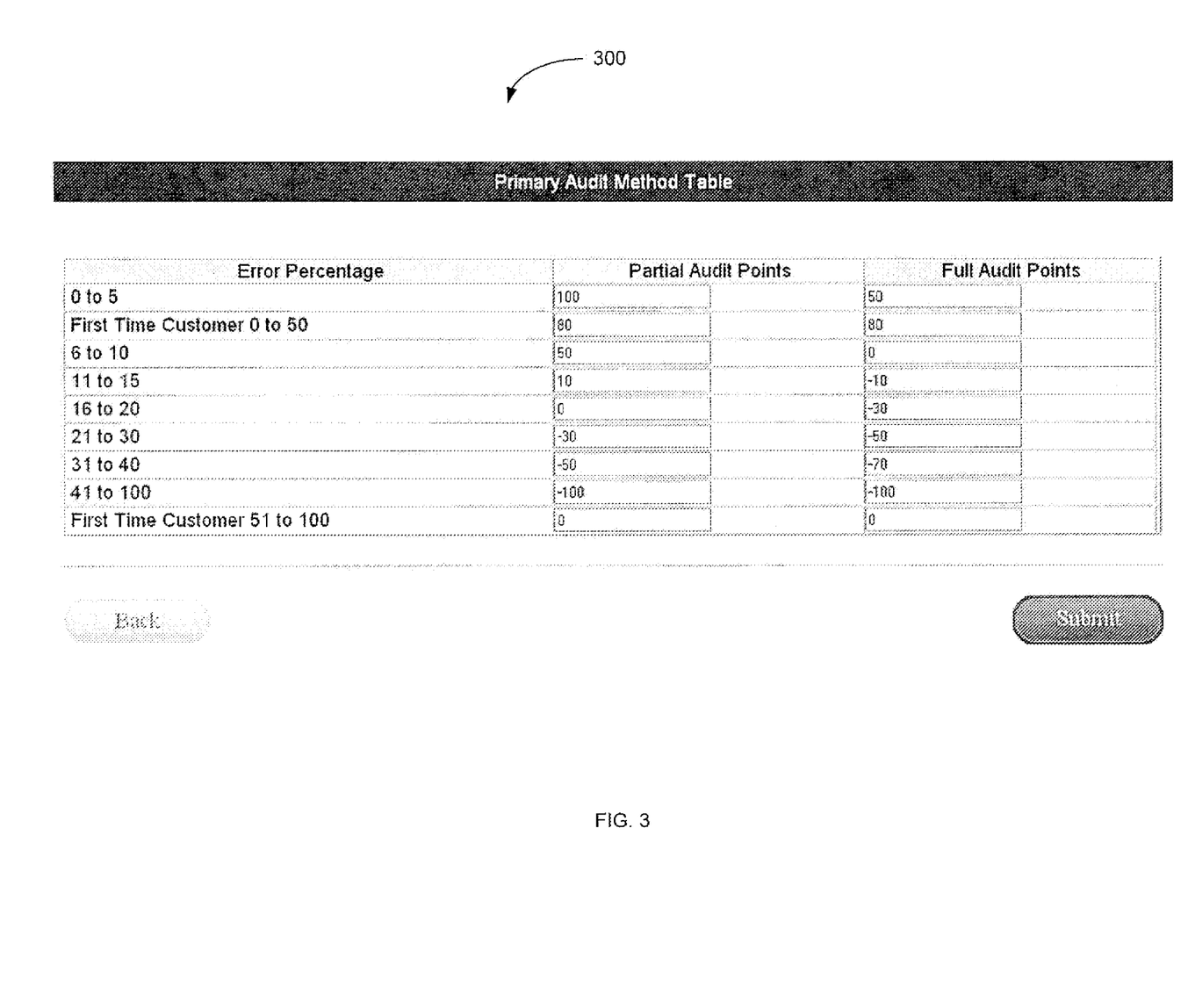
FIG. 3 illustrates an exemplary screenshot of a user interface for assigning audit points, in accordance with various embodiments of the present invention.

FIG. 3 illustrates an exemplary screenshot of a user interface 300 for assigning audit points, in accordance with various embodiments of the present invention.

Figure 4:
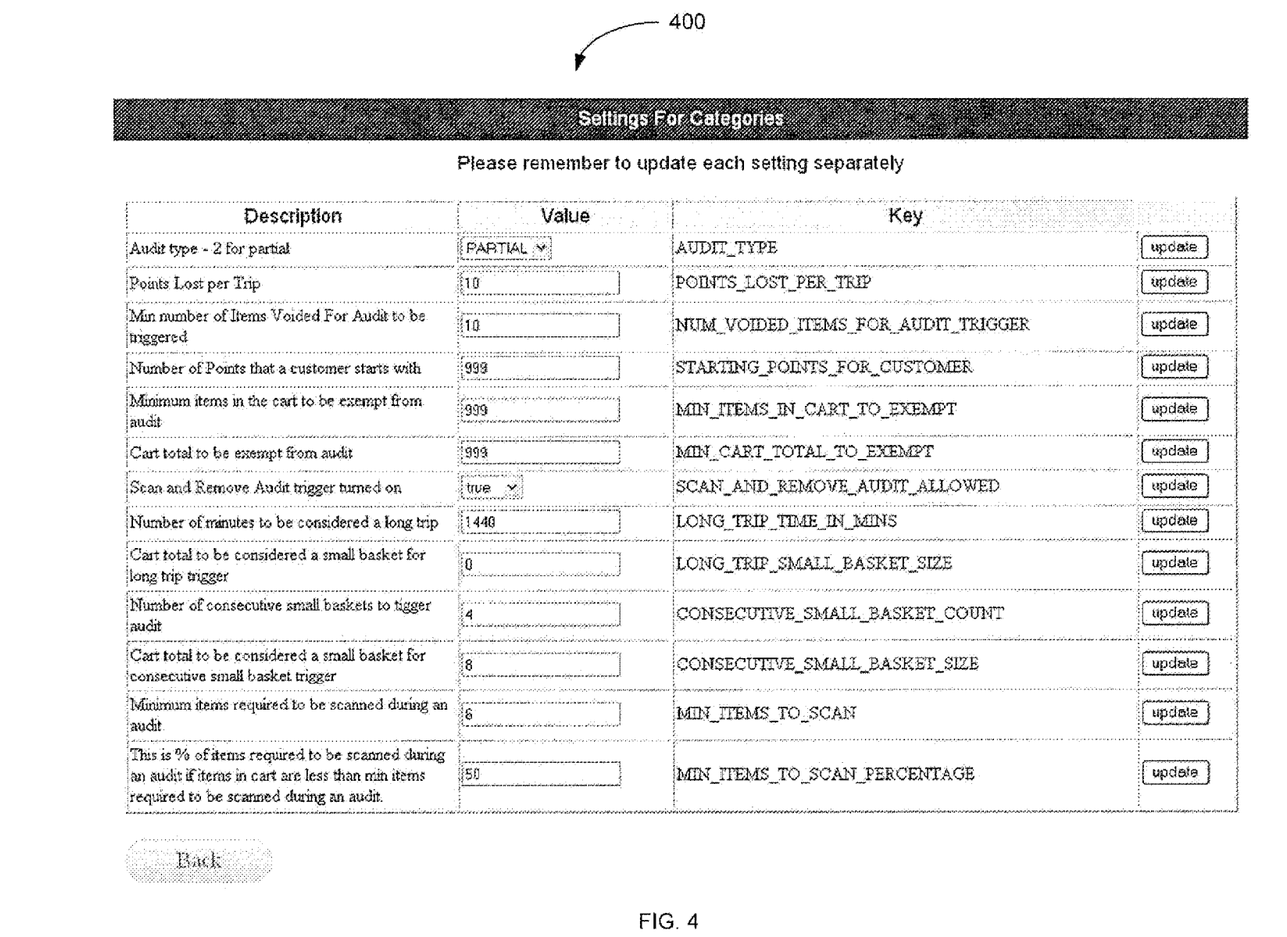
FIG. 4 illustrates an exemplary screenshot of a user interface for customizing settings, in accordance with various embodiments of the present invention.

FIG. 4 illustrates an exemplary screenshot of a user interface 400 for customizing settings, in accordance with various embodiments of the present invention.

Figure 5:
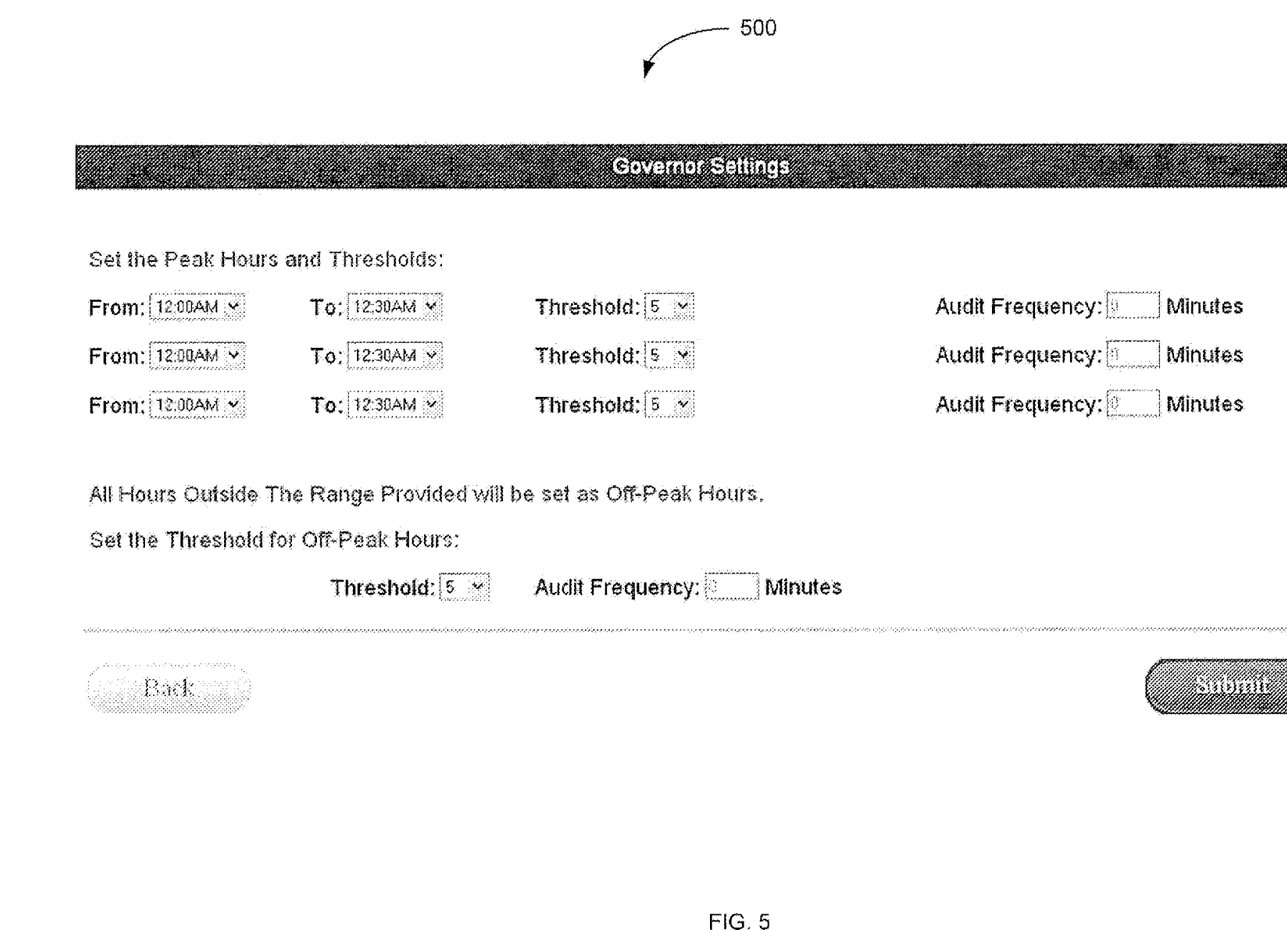
FIG. 5 illustrates an exemplary screenshot of a user interface for customizing settings based on hours of operation, in accordance with various embodiments of the present invention.

FIG. 5 illustrates an exemplary screenshot of a user interface 500 for customizing settings based on hours of operation, in accordance with various embodiments of the present invention.

The word "exemplary" is used in this description to mean "serving as an example, instance, or illustration". Any embodiment described herein as "exemplary" is not necessarily to be construed as preferred or advantageous over other embodiments. Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Particular terminology used when describing certain features or aspects of the invention should not be taken to imply that the terminology is being redefined herein to be restricted to any specific characteristics, features, or aspects of the invention with which that terminology is associated. In general, the terms used in the appended claims should not be construed to limit the invention to the specific embodiments disclosed in the specification, unless the Detailed Description section explicitly defines such terms. Accordingly, the actual scope of the invention encompasses not only the disclosed embodiments, but also all equivalent ways of practicing or implementing the invention.

Those of skill in the art would understand that any of the various illustrative logical blocks, modules, processors, means, and algorithm steps described in connection with the aspects disclosed here may be implemented as electronic hardware (for example, a digital implementation, an analog implementation, or a combination of said two, which may be designed using source coding or some other technique), various forms of program or design code incorporating instructions (which may be referred to herein, for convenience, as "software"), firmware, or combinations of the above. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those who are skilled in the art may implement the described functionality in varying ways for each particular application, but such implementation decisions should not be interpreted as causing a departure from the scope of the present disclosure.

If implemented in software, the functions may be stored on or transmitted over as one or more instructions or code on a computer-readable medium. A computer-readable medium can include a non-transitory storage media or communication media including any medium that facilitates transfer of a computer program from one place to another. A non-transitory storage media may be any available media that can be accessed by a computer. By way of example, and not limitation, such non-transitory storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

It should be appreciated that a computer readable medium may be implemented in any suitable computer-program product.

For a hardware implementation, embodiments can be implemented with processors, controllers, micro-controllers, microprocessors, electronic devices, other electronic units designed to perform the functions described herein, or a combination thereof. Memory can be implemented within the processor or external to the processor. As used herein the term "memory" refers to any type of long term, short term, volatile, nonvolatile, or other storage devices and is not to be limited to any particular type of memory or number of memories, or type of media upon which memory is stored. For a firmware and/or software implementation, embodiments can be implemented with modules such as procedures, functions, and so on, that perform the functions described herein. Any machine readable medium tangibly embodying instructions can be used in implementing the embodiments described herein.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of providing an in-trip audit in a self-checkout system, comprising:
   receiving, by a computer, an indication that a shopping trip is initiated by a customer;
   receiving, by the computer, an indication that multiple items to scan have been received in a self-scanning device associated with the customer;
   identifying, by the computer, audit parameters based on the items to scan, the audit parameters comprising a determined length of time between at least two scans during the shopping trip, the items to scan, and a value of items associated with the at least two scans;
   calculating, by the computer and based on the audit parameters, an audit score indicative of whether an in-trip audit should occur;
   comparing, by the computer, the audit score to a pre-defined audit threshold;
   determining, by the computer, after receiving the audit parameters and during or prior to a checkout by the customer, whether the in-trip audit should occur based on the comparing, and a probability value for the in-trip audit occurring that is based on a number of audit points associated with the customer, wherein the number of audit points is based on the audit parameters and adjusted to increase or decrease the probability value based on the audit parameters; and
   instructing, by the computer, the self-scanning device to provide, when the checkout is initiated for the customer indicating a shopping trip completion, an encoded identifier in a barcode comprising both an indication of whether the in-trip audit should occur based on the probability value, and an identification of the items associated with the at least two scans, wherein the audit score is indicative of a ratio between a basket size and a duration of the shopping trip.

2. The method of claim 1, wherein comparing the audit score to a pre-defined threshold comprises determining whether the audit score falls below a minimum threshold ratio or above a maximum threshold ratio.

3. The method of claim 2, wherein calculating the audit score further comprises determining the duration of the shopping trip based on the audit parameters.

4. The method of claim 3, wherein the predefined audit threshold comprises an allowed duration of the shopping trip, and wherein determining whether the in-trip audit should occur comprises:
   determining whether the duration of the shopping trip meets or exceeds the allowed duration.

5. The method of claim 1, wherein identifying the audit parameters comprises a plurality of voids received during the shopping trip.

6. The method of claim 5, wherein calculating the audit score comprises counting the plurality of voids.

7. The method of claim 6, wherein the predefined audit threshold comprises a maximum number of allowed voids, and wherein determining whether the in-trip audit should occur comprises:
   determining whether the counted plurality of voids meets or exceeds the maximum number of allowed voids.

8. The method of claim 1, wherein the indication that the customer has initiated the shopping trip is received in response to use of the self-scanning device to self-scan an item.

9. The method of claim 7, wherein the self-scanning device comprises a mobile device of the customer.

10. A system of providing an in-trip audit in a self-checkout system, comprising a computing device having one or more processors configured to:
    receive, by a computer, an indication that a shopping trip was initiated by a customer;
    receive, by the computer, an indication that a self-scanning device associated with the customer has received multiple items to scan;
    identify, by the computer, audit parameters based on the items to scan from the self-scanning device, the audit parameters comprising a determined length of time between at least two scans during the shopping trip, the items to scan, and a value of items associated with the at least two scans;
    calculate, by the computer and based on the audit parameters, an audit score of the customer indicative of whether an in-trip audit should occur;
    compare, by the computer, the audit score to a predefined audit threshold;
    determine, by the computer, after receiving the audit parameters and during or prior to a checkout by the customer, whether the in-trip audit should occur based on the compare, and a probability value for the in-trip audit occurring that is based on a number of audit points associated with the customer, wherein the number of audit points is based on the audit parameters and adjusted to increase or decrease the probability value based on the audit parameters; and
    instruct, by the computer, the self-scanning device to provide, when the checkout is initiated for the customer indicating a completion of the shopping trip, an encoded identifier in a barcode comprising both an indication of whether the in-trip audit should occur based on the probability value, and an identification of the items associated with the items to scan, wherein the audit score is indicative of a ratio between a basket size and a duration of the shopping trip.

11. The system of claim 10, wherein to compare the audit score to a pre-defined threshold the one or more processors are configured to determine whether the audit score falls below a minimum threshold ratio or above a maximum threshold ratio.

12. The system of claim 11, wherein the computing device is further configured to:
   determine the duration of the shopping trip based on the audit parameters.

13. The system of claim 12, wherein the predefined audit threshold comprises a maximum allowed duration of the shopping trip, and wherein the computing device is further configured to:
   determine whether the duration of the shopping trip meets or exceeds the maximum allowed duration.

14. The system of claim 12, wherein the predefined audit threshold comprises a minimum number or value of purchases per unit of time and wherein the computing device is further configured to:
   receive a plurality of scans comprising the at least two scans during the shopping trip; and
   determine that a number or value of the plurality of scans relative to a duration of the shopping trip is below the minimum number or value of purchases per unit of time.

15. The system of claim 12, wherein the computing device is further configured to:
   receive a plurality of scans comprising the at least two scans during the shopping trip.

16. The system of claim 12, wherein the predefined audit threshold comprises a maximum allowed time between the at least two scans, and wherein the computing device is further configured to:
   determine whether a length of time meets or exceeds the maximum allowed time.

17. The system of claim 16, wherein the computing device is further configured to:
   receive a plurality of voids during the shopping trip.

18. The system of claim 17, wherein the computing device is further configured to:
   count the plurality of voids.

19. The system of claim 18, wherein the predefined audit threshold comprises a maximum number of allowed voids, and wherein the computing device is further configured to:
   determine whether the plurality of voids meets or exceeds the maximum number of allowed voids.

20. A computer implemented method of providing an in-trip audit in a self-checkout system, comprising:
   receiving, by a computer, an indication of a shopping trip initiated by a customer;
   receiving, by the computer, an indication that a self-scanning device associated with the customer has received multiple items to scan;
   identifying, by the computer, audit parameters based on the items to scan from the self-scanning device, the audit parameters comprising a determined length of time between at least two scans during the shopping trip, the items to scan, and a value of items associated with the at least two scans;
   calculating, by the computer and based on the audit parameters, an audit score for the shopping trip of the customer indicative of whether an in-trip audit should occur;
   comparing, by the computer, the audit score to a pre-defined audit threshold;
   determining, by the computer, after receiving the audit parameters and during or prior to a checkout by the customer, whether the in-trip audit should occur based on the comparing, and a probability value for the in-trip audit occurring that is based on a number of audit points associated with the customer, wherein the number of audit points is based on the audit parameters and adjusted to increase or decrease the probability value based on the audit parameters; and
   instructing, by the computer, the self-scanning device to provide, when the checkout is initiated for the customer indicating a completion of the shopping trip, an encoded identifier in a barcode comprising both an indication of whether the in-trip audit should occur based on the probability value, and an identification of the items associated with the items to scan, wherein the audit score is indicative of a ratio between a basket size and a duration of the shopping trip.

* * * * *